US009460667B2

(12) United States Patent
Bozarth et al.

(10) Patent No.: US 9,460,667 B2
(45) Date of Patent: Oct. 4, 2016

(54) INCREMENTAL PAGE TRANSITIONS ON ELECTRONIC PAPER DISPLAYS

(75) Inventors: Bradley J. Bozarth, Sunnyvale, CA (US); Julien G. Beguin, San Francisco, CA (US); Jay Michael Puckett, Campbell, CA (US); Ilya D. Rosenberg, Mountain View, CA (US); Tomer Moscovich, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 1198 days.

(21) Appl. No.: 13/305,281

(22) Filed: Nov. 28, 2011

(65) Prior Publication Data

US 2013/0135215 A1    May 30, 2013

(51) Int. Cl.
| | |
|---|---|
| *G09G 3/34* | (2006.01) |
| *G06F 3/147* | (2006.01) |
| *G06F 3/0483* | (2013.01) |
| G09G 5/393 | (2006.01) |
| G09G 5/395 | (2006.01) |
| G09G 5/399 | (2006.01) |

(52) U.S. Cl.
CPC ............. *G09G 3/344* (2013.01); *G06F 3/0483* (2013.01); *G06F 3/147* (2013.01); *G09G 5/393* (2013.01); *G09G 5/395* (2013.01); *G09G 5/399* (2013.01); *G09G 2310/0251* (2013.01); *G09G 2310/04* (2013.01); *G09G 2320/0257* (2013.01); *G09G 2340/14* (2013.01); *G09G 2354/00* (2013.01); *G09G 2360/18* (2013.01); *G09G 2380/14* (2013.01)

(58) Field of Classification Search
CPC . G06F 3/0482; G06F 3/0483; G06F 17/0217
USPC ........................................ 345/173–174, 522
See application file for complete search history.

(56) References Cited

U.S. PATENT DOCUMENTS

| | | | | |
|---|---|---|---|---|
| 5,467,102 | A  * | 11/1995 | Kuno et al. .................... | 345/1.3 |
| 2005/0001812 | A1* | 1/2005 | Amundson et al. .......... | 345/107 |
| 2007/0057905 | A1  | 3/2007 | Johnson et al. | |
| 2008/0291184 | A1  | 11/2008 | Zhou et al. | |
| 2008/0309657 | A1* | 12/2008 | Rhodes et al. ................ | 345/214 |
| 2010/0156913 | A1* | 6/2010 | Ortega et al. ................. | 345/520 |
| 2010/0271378 | A1  | 10/2010 | Low et al. | |
| 2011/0084979 | A1  | 4/2011 | Rutman et al. | |
| 2012/0198330 | A1* | 8/2012 | Koppel et al. ................ | 715/251 |

FOREIGN PATENT DOCUMENTS

| | | |
|---|---|---|
| JP | 08106469 | 4/1996 |
| JP | 11134351 | 5/1999 |

(Continued)

OTHER PUBLICATIONS

The PCT Search Report mailed Jan. 31, 2013 for PCT application No. PCT/US12/66826, 8 pages.

(Continued)

*Primary Examiner* — Calvin C Ma
(74) *Attorney, Agent, or Firm* — Lee & Hayes, PLLC

(57) ABSTRACT

Techniques for implementing incremental page transitions on an electronic paper display of an electronic device are described herein. In some instances, an electronic-paper display controller that allows for per-pixel or multiple-pixel-block updating enables the incremental page transitions.

30 Claims, 10 Drawing Sheets

(56) References Cited

FOREIGN PATENT DOCUMENTS

| JP | 2004288208 | 10/2004 |
|---|---|---|
| JP | 2009282433 | 12/2009 |
| JP | 2010117446 | 5/2010 |
| JP | 2010204418 | 9/2010 |
| JP | 2011138005 | 7/2011 |
| WO | WO2011002577 | 1/2011 |

OTHER PUBLICATIONS

Anonymous, "Special Edition Using Microsoft Office PowerPoint 2003—Patrice-Anne Rutledge, Jim Grey, Tom Mucciolo—Google Livres", retrieved on Apr. 9, 2015 at <<https://books.google.de/books?id=1Xha4_exEZwC&pg=PA231&lpg=PA231&dq=data+sheet+power+point&source=bl&ots=veJdzkWU2k&sig=GfXwVVOTkD7ivGc2SaqisaJ1TRU&hl=fr&sa=X&ei=jYUmVY3SKYvgavf7gegB&ved=OCDUQ6AEwAjgK#v=onepage&q=transition&f=false>>, Dec. 15, 2004, p. 321, paragraph 15-p. 340, paragraph 15.

The Extended European Search Report mailed Apr. 20, 2015 for European Patent Application No. 12853363.5, 10 pages.

Translated the Japanese Office Action mailed Sep. 1, 2015 for Japanese Patent Application No. 2014-543620, a counterpart foreign application of U.S. Appl. No. 13/305,281, 7 pages.

Translated the Japanese Office Action mailed Mar. 15, 2016 for Japanese Patent Application No. 2014-543620, a counterpart foreign application of U.S. Appl. No. 13/305,281, 6 pages.

* cited by examiner

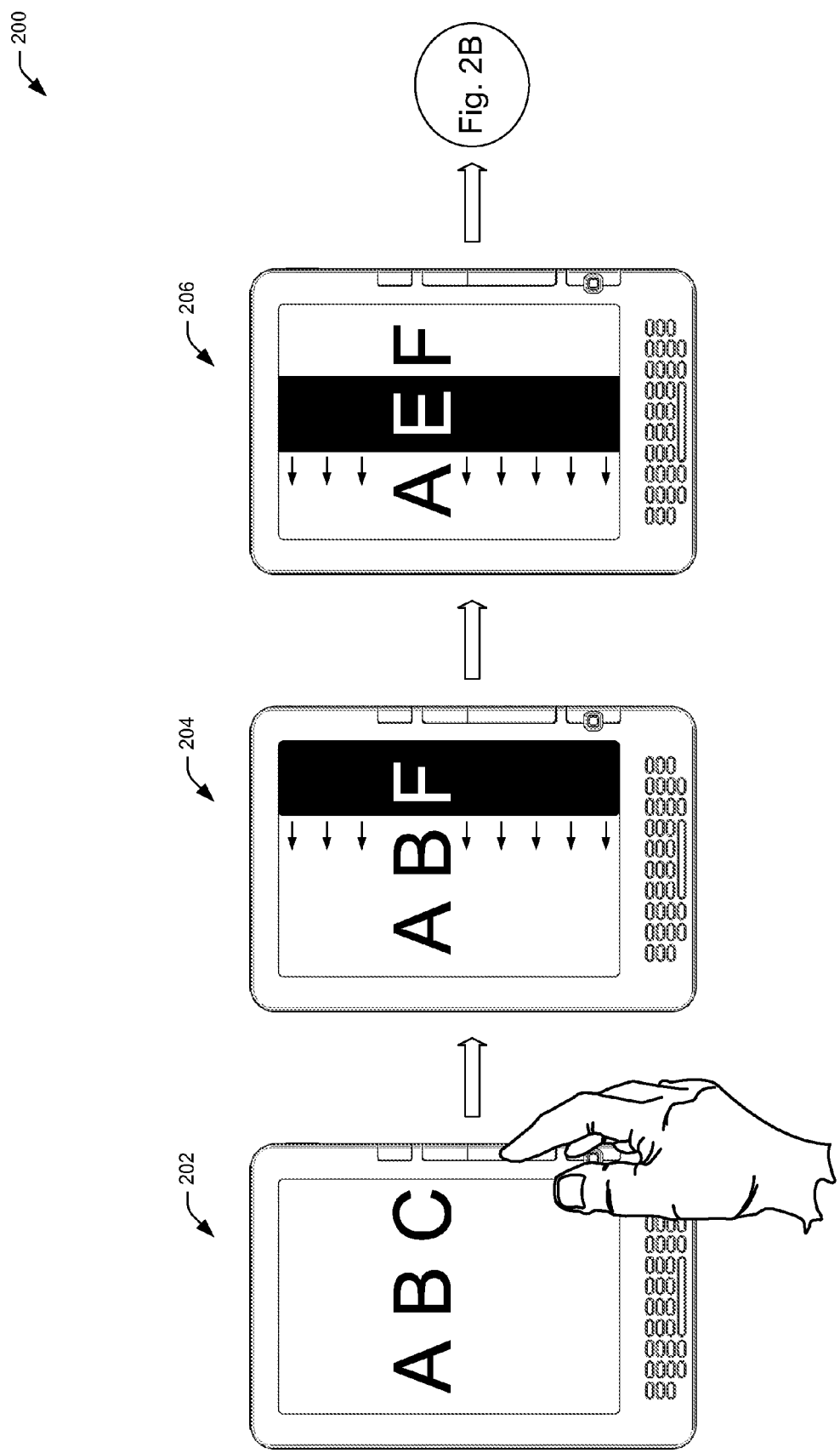

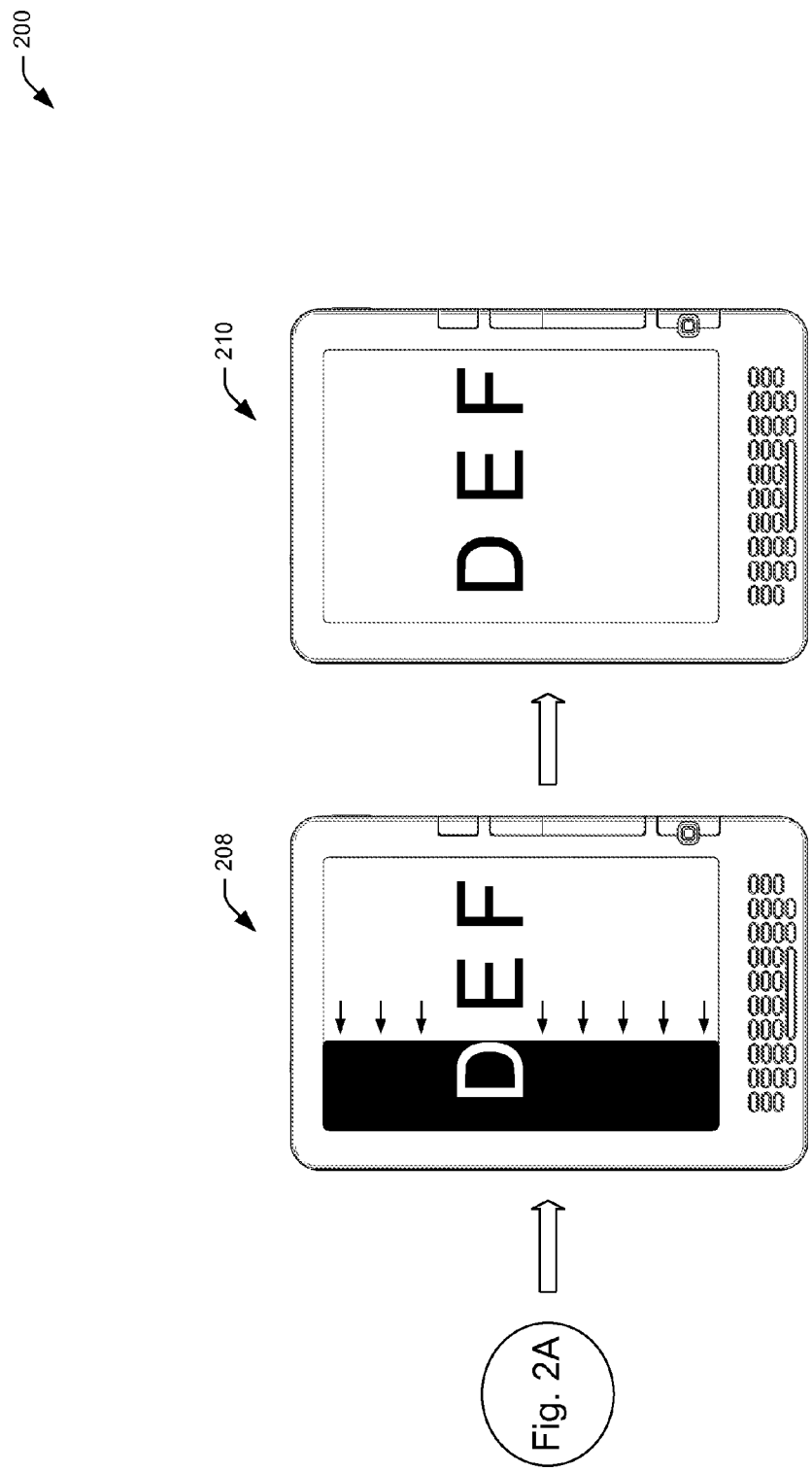

INCREMENTAL PAGE TRANSITIONS ON ELECTRONIC PAPER DISPLAYS

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A-2B illustrate an example flow diagram of the electronic device performing an incremental page transition in response to receiving a request from a user to proceed to a next page of a rendered content item.

DETAILED DESCRIPTION

Overview

Figure 1:
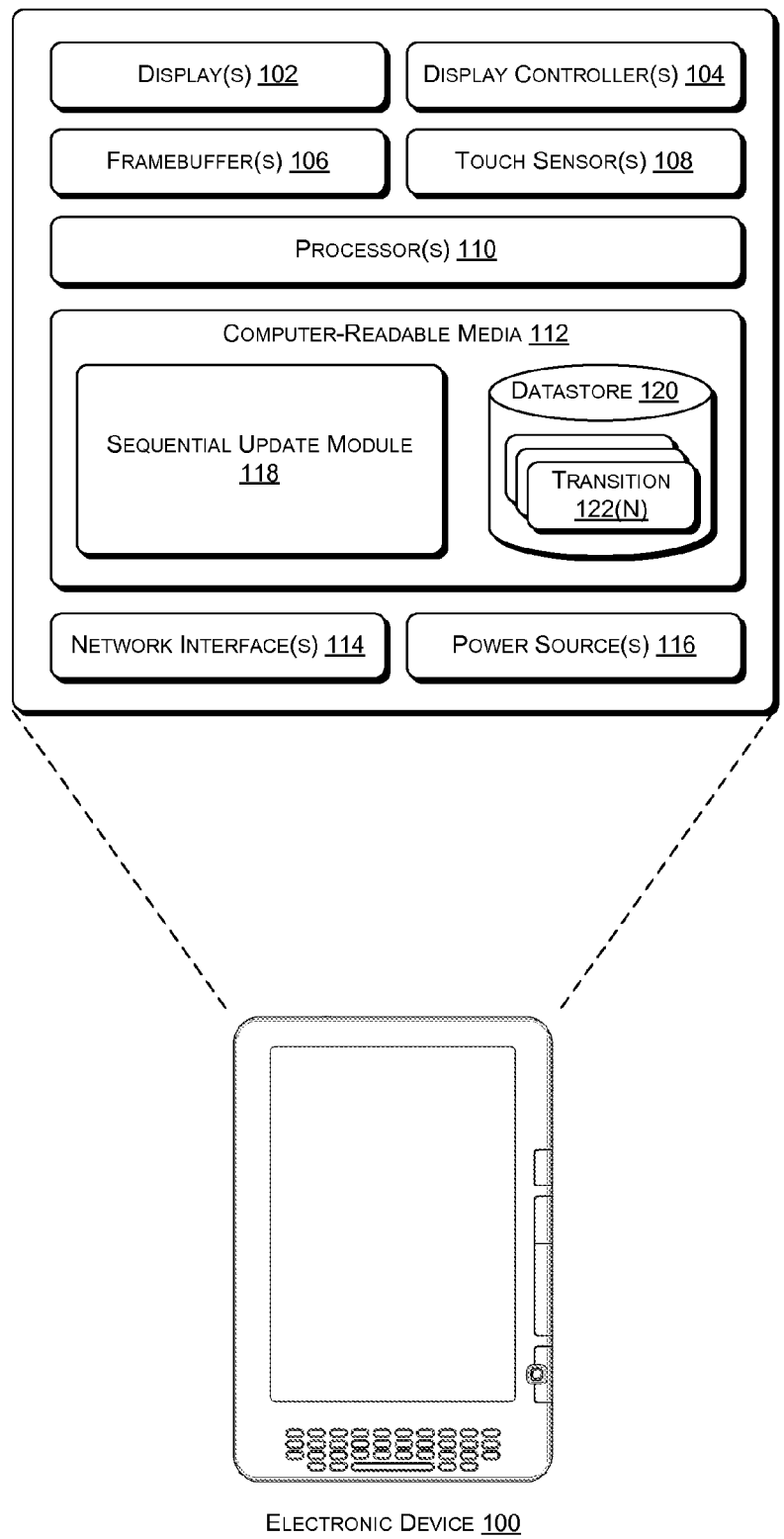
FIG. 1 illustrates an example electronic device that includes an electronic paper display and functionality for performing incremental page transitions on the electronic paper display.

This disclosure describes, in part, techniques for implementing incremental page transitions on an electronic paper display of an electronic device. In some instances, an electronic-paper display controller that allows for per-pixel or multiple-pixel-block updating enables the incremental page transitions described herein.

Traditionally, when a user requests that an electronic device implementing an electronic paper display render a new piece of content, the device issues a single update request to a display controller of the device. That is, the device fills a framebuffer with a certain amount of pixel values (which may or may not correspond to the entire display) and then issues a single request to update the pixels associated with the pixel values in the framebuffer. In response, the display controller updates each pixel of the display (or each pixel of the block of pixels currently being updated) at approximately a same time. In contrast, the techniques described below may fill a framebuffer with a certain amount of pixel values and then issue sequential requests over a relatively short period of time, with each of the requests corresponding to a block of one or more pixels. As such, the techniques "uncover" the different portions of the pixels having values that have been filled in the framebuffer. Filling a framebuffer with pixel values and then sequentially updating those pixels in this manner allows for more aesthetically pleasing, animation-like updates as compared to traditional all-at-once updates.

To illustrate, envision that a user reading an electronic book an electronic device implementing an electronic paper display requests to turn from a first page of the electronic book to a second page. In response, the display controller may fill a framebuffer with a large block of pixel values and then initiate an update that includes a series of sequential requests that may be performed serially, overlapping with one another, or a combination thereof. To perform this update, the device may issue a series of requests over a predetermined schedule that uncovers the pixel values in the framebuffer over time. To issue the sequential requests, the device may send a separate instruction corresponding to each request to the controller, may send a single command including a schedule for the sequential requests, or may implement some combination thereof (e.g., sending instructions in groups of two). In either instance, the techniques first fill a framebuffer with values for a set of pixels and then sequentially update portions of that set of pixels over time, as opposed to simply filling a framebuffer, updating the entire framebuffer, and then repeating this process (as is done using traditional techniques).

Collectively, the updating of the pixel blocks may give the appearance of an intentional animation, in contrast to the jarring experience of a single flashing update. For instance, the page transition may comprise a rolling page transition where adjacent pixel blocks are updated from left to right, right to left, top to bottom, bottom to top, corner to corner or the like. As such, when the user requests to turn to the second page in this example, the user may see the update "roll" across the screen rather than experiencing a single flashing update on the screen.

Further, the example page transition may take many different forms. For instance, the page transition may comprise a corner page transition that begins on a top corner of the electronic paper display in a diagonal line before arcing around horizontally to simulate the turning of a page in a physical book by grabbing and flipping the corner of the physical page. In another example, the page transition may comprise a burn page transition that mimics the appearance of multiple holes burning through a first page to a second, underlying page. Stated otherwise, the display controller may initially update pixel blocks each comprising a smooth- or jagged-edged hole within the page, with these holes visually expanding as the display controller processes the sequential instructions for the remaining pixel blocks. Stated otherwise, the display controller may initially update one or more origin pixels (or sets of origin pixels) and then update pixels radially outwards from these origin pixels in a smooth or jagged pattern. Additionally or alternatively, the page transitions may comprise any sort of animated transition, such as expanding or contracting shapes (e.g., an expanding or contracting circle), object fly-ins, blinds (vertical or horizontal), sparkle effects, an effect similar to elevator doors closing, or any other type of animation.

In instances where the electronic device implements a touch-sensitive display, the electronic device may implement page transitions that track a touch input as the touch input moves across the display. For instance, envision that the user described above issues a request to transition from a first page of an electronic book to a second page by swiping her finger from right to left across the display. In response to detecting the user's swipe gesture on the right side of the display, the device may issue sequential instructions to update pixel blocks corresponding to the location of the user's finger. For instance, the device may update a first vertical strip of pixels to the right of the user's finger and then update adjacent vertical strips as the user moves across the touch-sensitive display. This update may resemble the user flipping over a page in a physical book. When the swiping gesture reaches a certain threshold, the device may instruct the display controller to complete the page turn from the first page to the second page. Completing the page turn may include multiple sequential instructions corresponding to adjacent blocks of pixels. The threshold may be based on an overall length of the swipe gesture, a horizontal line defined on the display, or a combination thereof.

Furthermore, if the user moves her finger back to the right prior to reaching the threshold, the device may correspondingly instruct the display controller to re-render content from the first page in rolling vertical strips. Again, this may mimic the look of a user turning back to the first page on a physical book.

In some instances described herein, the techniques may update portions of an electronic paper display that are less than the entire display. For instance, when a user requests that an electronic device display a virtual keyboard on an electronic paper display of the device, the device may render this keyboard utilizing the described sequential instructions, which correspond to the portion of the display that will render the keyboard. Similarly, when the device renders a pop-up menu, toolbar, or other piece of content that only covers a portion of the display, the device may render the content via sequential instructions that correspond to only the portion of the display that is assigned to render the piece of content.

The incremental page transitions described herein may be implemented in a variety of ways and by a variety of electronic devices. While a few examples are illustrated and described below, it is to be appreciated that other electronic devices may implement any similar or different incremental page transition. Furthermore, it is noted that because electronic books are structured as virtual frames presented on a computing device, the term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like.

In addition, the term "electronic book", "eBook", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

Example Electronic Device

FIG. 1 illustrates an example electronic device 100 configured to implement the incremental page transitions introduced above. While FIG. 1 illustrates the device 100 as a dedicated electronic book reading device, in other implementations the device 100 may comprise any other type of mobile electronic device (e.g., a laptop computer, a tablet computing device, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, this device 100 includes one or more displays 102 and corresponding display controllers 104. The device 100 may also include one or more framebuffers 106 from which the display controller(s) 104 updates the display(s) 102. The one or more displays 102 may represent electronic paper displays, liquid crystal displays (LCDs), plasma displays, Light Emitting Diode (LED) displays, and/or the like. In some instances, the electronic device 100 utilizes at least one electronic paper display for rendering content on the device 100.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the electronic paper display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the electronic paper display 102 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

Of course, while two different examples have been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In some instances, the display controller 104 allows for per-pixel updating of the electronic paper display of the device 100. That is, the controller 104 may update any arbitrary block of one more pixels of the display at any one time. In other instances, the display controller does not allow for per-pixel updating but instead allows for updating of different-sized pixel blocks at one time, with these blocks including less than all of the pixels of the display. In either instance, the display controller 104 allows for incremental page transitions by sequentially updating different blocks of pixel(s) according to a predefined schedule.

In addition to including the one or more displays 102 and corresponding functionality, FIG. 1 illustrates that the device 100 includes one or more touch sensors 108. In some instances, at least one touch sensor 108 resides underneath, on top of, or integral with a corresponding display 102 to form a touch-sensitive display (e.g., an electronic paper touch-sensitive display) that is capable of both accepting user input and rendering content corresponding to the input. In other instances, the device 100 may include a touch sensor that is adjacent to a display. It is to be appreciated that the techniques described below may apply to instances where the touch sensor 108 and the display 102 form a touch-sensitive display and instances where the sensor 108 and the display 102 do not.

The touch sensor 108 may comprise a capacitive touch sensor, a force sensitive resistance (FSR), an interpolating force sensitive resistance (IFSR) sensor, or any other type of touch sensor. In some instances, the touch sensor 108 is capable of detecting touches as well as determining an amount of pressure or force of these touches.

FIG. 1 further illustrates that the electronic device includes one or more processors 110 and computer-readable media 112, as well as one or more network interfaces 114 and one or more power sources 116 that provide power to the device 100. The network interfaces 114 may support both wired and wireless connection to various networks, such as cellular networks, radio, WiFi networks, short range networks (e.g., Bluetooth), IR, and so forth.

Depending on the configuration of the electronic device 100, the computer-readable media 112 (and other computer-readable media described throughout) is an example of computer storage media and may include volatile and non-volatile memory. Thus, the computer-readable media 112 may include, but is not limited to, RAM, ROM, EEPROM, flash memory, or other memory technology, or any other medium which can be used to store media items or applications and data which can be accessed by the electronic device 100.

The computer-readable media 112 may be used to store any number of functional components that are executable on the processors 110, as well as data and content items that are rendered by the electronic device 100. Thus, the computer-readable media 112 may include an operating system and a storage database to store one or more content items, such as eBooks, audio books, songs, videos, still images, and the like. The computer-readable media 112 of the electronic device 100 may also store one or more content presentation applications to render content items on the device 100. These content presentation applications may be implemented as various applications depending upon the content items. For instance, the application may be an electronic book reader application for rending textual electronic books, an audio player for playing audio books or songs, a video player for playing video, and so forth.

As illustrated, in this example the computer-readable media 112 includes or has access to a sequential update module 118 and a datastore 120, which in turn stores or has access to one or more incremental page transitions 122(1), . . . , 122(N). Each of the incremental page transitions 122(1)-(N) in the datastore 120 represents a unique page transition (relative to one another) and comprises a schedule of sequential instructions for performing the corresponding page transition. That is, each page transition 122(1)-(N) specifies, for each of multiple pixel blocks, the compilation of the pixel block, the time at which the pixel block is to be updated relative to an initiation of the transition, an update type of the pixel block, and/or a waveform to be implemented when updating the pixel block. In some instances, therefore, the sequential instructions identify different blocks of pixels to update and an order and a manner in which to update these blocks of pixels. In other instances, meanwhile, the sequential instructions do not necessarily identify an order of the updates.

The update type may specify which of multiple different waveforms that the display controller 104 will implement when performing the specified update. In some instances, the page transition may implement a "flashing" update, which includes causing each pixel to be rendered as either black or white before being rendered according to a value specified by the content. For instance, if a pixel is initially white but has a value corresponding to gray according to content that is to be rendered on the display, then the display controller 104 may initially render this pixel black before rendering it in the specified gray. This use of flashing updates helps alleviate ghosting effects from previously rendered content in some instances. Of course, while some implementations may utilize flashing updates, other implementations may utilize any other type of update and/or waveform. In some instances, for example, the page transitions 122(1)-(N) may specify multiple different stacked waveforms, which the display controller 104 may implement when executing the corresponding page transition.

The sequential update module 118, meanwhile, functions to select one of the page transitions 122(1)-(N) from the datastore in response to receiving a request to navigate to a different portion of a content item or to a new content item. For instance, when a user requests to render certain content on the device 100 (e.g., by powering on the device, turning a page in an electronic book, etc.), the sequential update module 118 may select a page transition to update, may identify the sequential instructions associated with the selected page transition, may cause the framebuffer 106 to fill with the to-be-rendered content, and may issue the sequential instructions to the display controller 104. As described above, the module 118 may issue the sequential instructions as individual instructions, as a single batch operation, or in any other manner.

In some instances, the sequential update module 118 may take into account a variety of additional factors when executing the sequential instructions. For instance, the module 118 may reference a number of updates that the particular display controller of the device can handle, how many updates the controller currently has available, a speed of a waveform being utilized, an ambient temperature, and like. Based on this information, the module 118 may alter the size, speed, waveform, and/or other characteristics of one or more of the sequential instructions. For instance, if the module 118 determines that the display controller has very few updates available at a particular moment, the module 118 may increase a size of the pixel blocks being updated and reduce an overall number of the instructions. In some instances, the display controller itself publishes events indicating a number of updates currently available and/or other information for use by the module 118.

In response to receiving the sequential instructions, the display controller 104 may begin updating the display 102 accordingly. For instance, the display controller 104 may perform the updates that collectively appear as a rolling page transition, a burn-through transition, or any other type of animation corresponding to the selected page transition.

In some instances, the electronic device 100 may have features or functionality in addition to those that FIG. 1 illustrates. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 114 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Flow Diagrams

FIGS. 2A-2B illustrate an example flow diagram 200 of the electronic device 100 performing an incremental page transition in response to receiving a request from a user to proceed to a next page of a rendered electronic book. At 202, a user of the electronic device requests to navigate to the page of an electronic book subsequent to the currently rendered page. In this example, the user issues the requests via a dedicate page-turn button, although in other instances the user may issue the command via a touchscreen, a voice command, or via any other suitable input.

As illustrated, at 202 the device 100 renders a page of an electronic book comprising the first three letters of the English alphabet: A B C. At 204, the device 100 initiates a page transition to a second page of the rendered electronic book, which in this basic example comprises the following three letters of the alphabet: D E F. As illustrated, this example page transition begins by updating a block of pixels on a right side of the display 102. Because this example comprises a "flashing" update, the display controller first renders each pixel in the illustrated block of pixels as either white or black depending upon the value of the pixel corresponding to the second page of content. Here, device 100 changes each pixel that will ultimately be white in the second page to black, and each pixel that will be black or gray to white. As such, the "F" within the block of pixels being updated flashes to white and the other pixels from the block flash to black. The act at 204 also illustrates that the page transition is rolling from right to left.

At 206, the device 100 updates a block of pixels adjacent to the block updated at 204. Here, the display controller 104 flashes this block of pixels as discussed above with reference to 204. Note that at 206, the electronic device has fully updated the far-right block of pixels, as the "F" now appears in black.

FIG. 2B continues the illustration of the flow diagram 200. At 208, the page transition has moved to a block of pixels on the far-left side of the display 102. Specifically, the display controller 104 is now flashing this block of pixels, as the final letter of the second page, "D", now appears in white surround by the black pixels. The "E" and "F", meanwhile, have been rendered in their value corresponding to the second page (here, black). Finally, at 210, the page transition has completed and the second page is now rendered in its entirety.

As described above, traditional electronic devices with electronic paper displays may implement the illustrated page transition by flashing the entire screen at one time and then rendering the second page. The techniques illustrated in FIGS. 2A-2B, however, may result in a more aesthetically pleasing page turn, as the transition itself appears intentional and, in some instances, mimics the page turn of a physical book. Of course, while one example transition has been illustrated, it is to be appreciated that the techniques may implement any other type of page transition, described above or otherwise.

Figure 3:
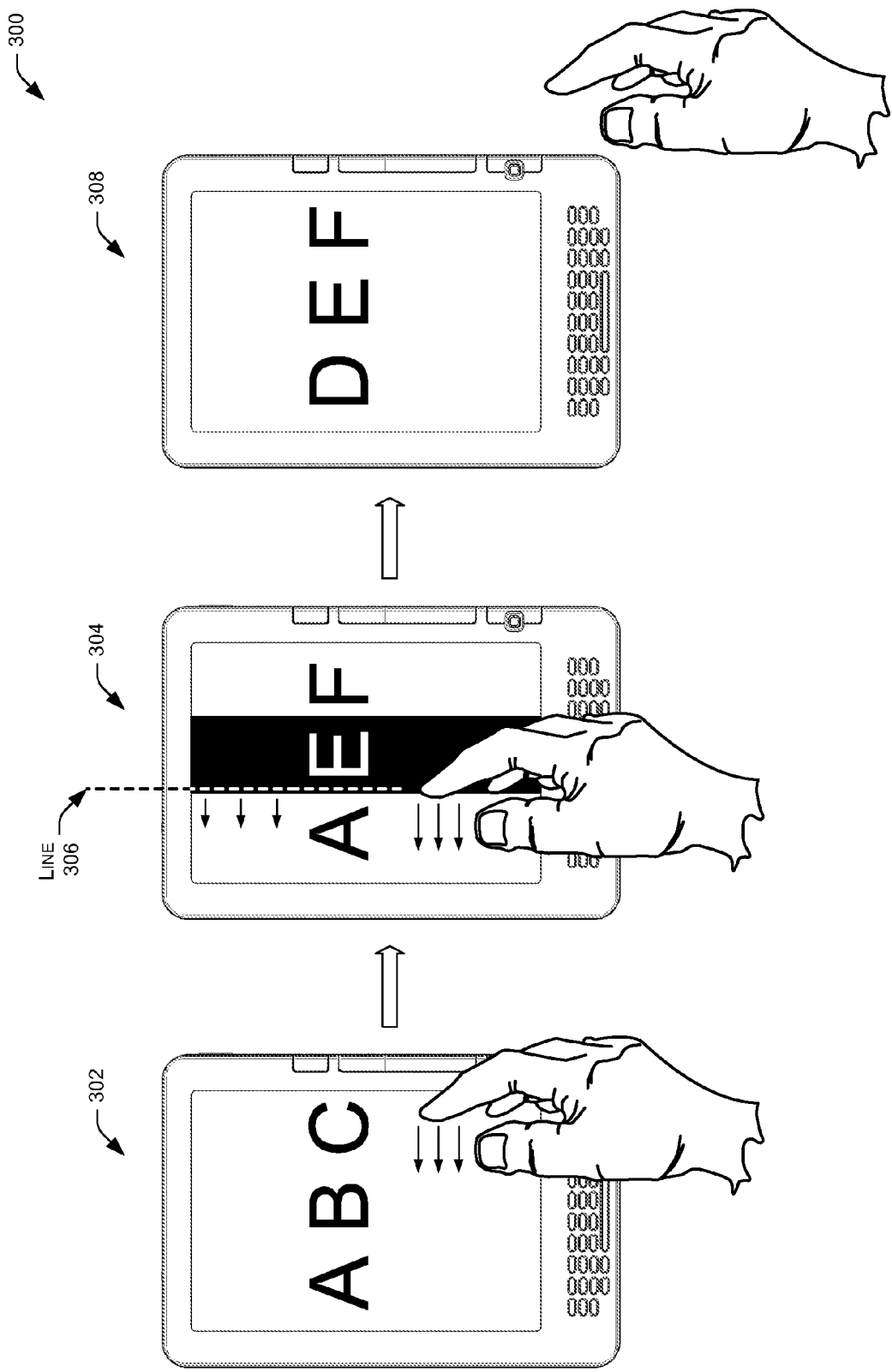
FIG. 3 illustrates another example flow diagram of performing an incremental page transition when the electronic device implements a touch-sensitive electronic paper display. Here, the user requests to proceed to the next page of the rendered content item via a touch input and, in response, the device causes the page transition to track the user's touch input as the touch input moves across the touch-sensitive display.

FIG. 3 illustrates another example flow diagram 300 of performing an incremental page transition when the electronic device 100 implements a touch-sensitive electronic paper display 102. Here, the user requests to proceed to the next page of the rendered content item via a touch input as shown at 302. Specifically, the user here swipes from the right to the left, although the touch input may comprise any other gesture in other instances. In response, at 304, the device 100 initiates a page transition that tracks the user's touch input as the touch input moves across the touch-sensitive display. For instance, the device 100 provides the rolling page transition illustrated in FIGS. 2A-2B, with the speed and location of the update being based at least in part on a current location of the touch input.

To illustrate, FIG. 3 depicts a line 306 that is approximately perpendicular to the direction of the swiping gesture of the user across the screen. As illustrated at 304, the display controller has updated content behind the line 306, while the display 102 continues to render content from the first page on the opposite side off of the line. Furthermore, the display controller 104 is configured to continue to track the gesture of the user and update the display accordingly. At 308, for instance, the user has completed the gesture and, therefore, the device 100 renders the entirety of the second page of content ("D E F"). If, however, the user were to move her finger to the right (rather than left) at 304, the device 100 would render additional portions of the first page to the left side of the line 306. By tracking the user's swipe gesture in this manner, the device 100 provides an interface that mimics the turning of a page in a physical book. That is, if a user begins to turn from a first page to a second page, but then decides to remain on the first page, the device initially renders a portion of the second page before turning back to the first page, mimicking the experience of a physical book.

Figure 4:
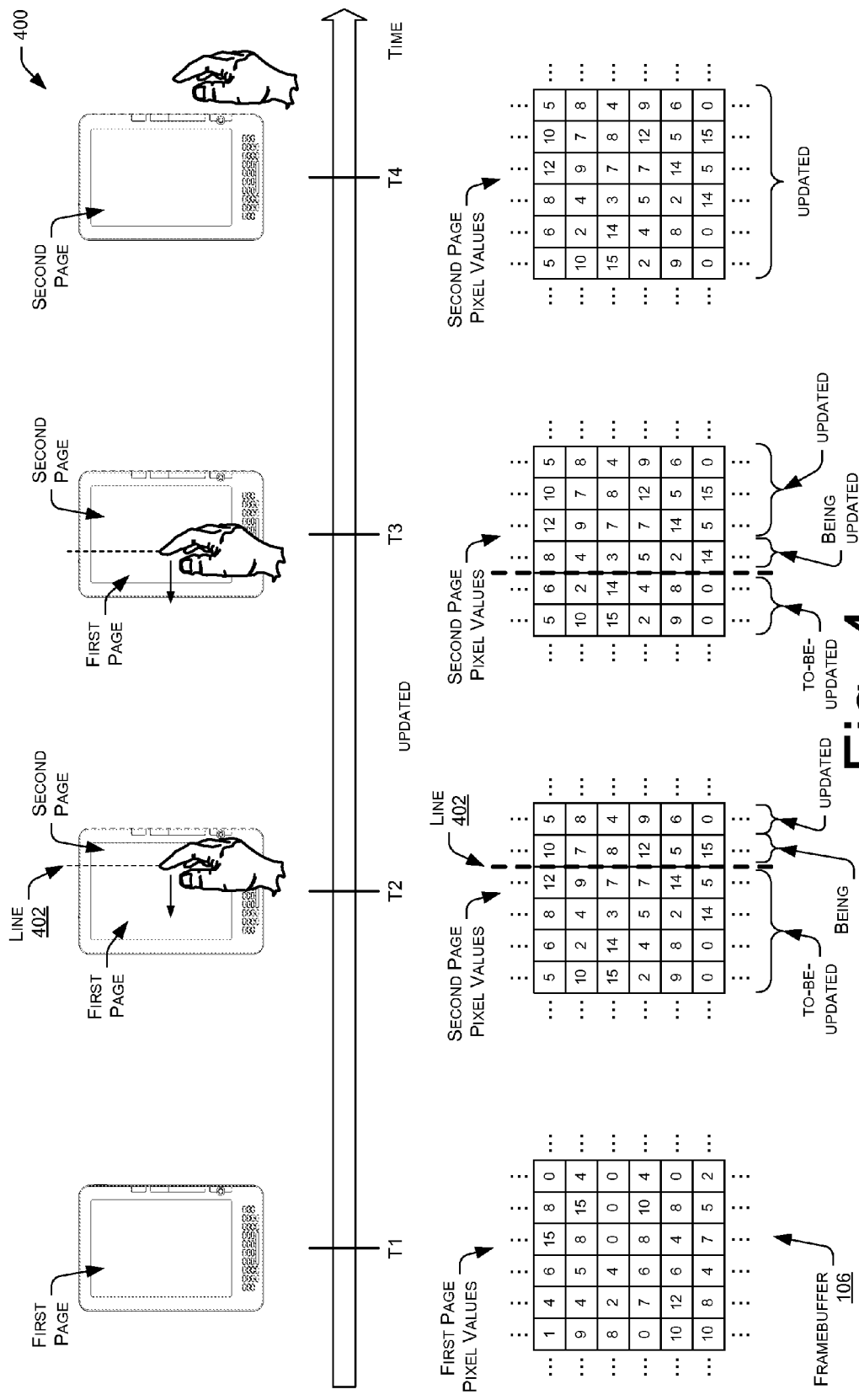
FIG. 4 illustrates an example timeline of the device implementing an incremental page transition in response to receiving a request from a user to navigate from a first page of a content item to a second page. In this illustrated example, the device fills a framebuffer with pixel values corresponding to the second page and then incrementally updates the display with reference to the pixel values.

FIG. 4 illustrates an example timeline 400 of the device 100 implementing an incremental page transition in response to receiving a request from a user to navigate from a first page of an electronic book to a second page. In this example, the illustrations above the timeline 400 represent the user's interaction with the device 100 and the content rendered on the device 100. The illustrations below the timeline, meanwhile, represent the contents of the framebuffer 106 during, and in response to, the user's interactions. As discussed in detail below, in this example the device 100 fills the framebuffer 106 with pixel values corresponding to the second page and then incrementally updates the display with reference to the pixel values.

At a first time T1, the device 100 renders content of a first page of the electronic book. As such, the framebuffer 106 is currently filled with pixel values corresponding to the contents of the first page, or at least was filled with these contents when the device 100 initially rendered the first page. In this example, the pixel values comprise one of seventeen different values, with "0" representing white, "16" representing black, and the values there between representing a respective shade of gray. Of course, while FIG. 4 illustrates one example, it is to be appreciated that the pixel values may be represented in any other manner.

At a time T2, the user provides a touch input on the touch-sensitive display of the electronic device in the form of a right-to-left swipe gesture. In response to this swipe gesture, the device 100 may initiate an incremental page transition that tracks the gesture across the display. That is, and as illustrated at time T2, the device 100 may continue to render content from the first page to the left of a line 402 perpendicular to a location of the touch input, while rendering content from the second page to the right of the line 402.

As shown below the timeline 400 at time T2, in response to detecting the swiping gesture the device 100 may fill the framebuffer 106 with pixel values corresponding to the second page, which is the page to which the user is requesting to navigate to. However, while the framebuffer 106 includes each pixel value corresponding to the second page in this example, the device 100 actually updates blocks of pixels to the right of the line. As such, the framebuffer 106 at time T2 indicates that a portion of the second-page pixels have been updated, while another portion is currently being updated, and yet another portion (that is left of the line 402) has yet to be updated.

At a time T3, meanwhile, the illustration above the timeline 400 indicates that the user's swiping gesture has continued to move to the left across the touch-sensitive display. Therefore, as illustrated underneath the timeline 400, more pixel values from the second page in the framebuffer 106 have been updated and relatively few pixel values have yet to be updated. Finally, at a time T4, the user has completed the swiping gesture and the device has rendered the entire second page by updating each of the pixels of the display with contents of the second page from the framebuffer 106.

Figure 5:
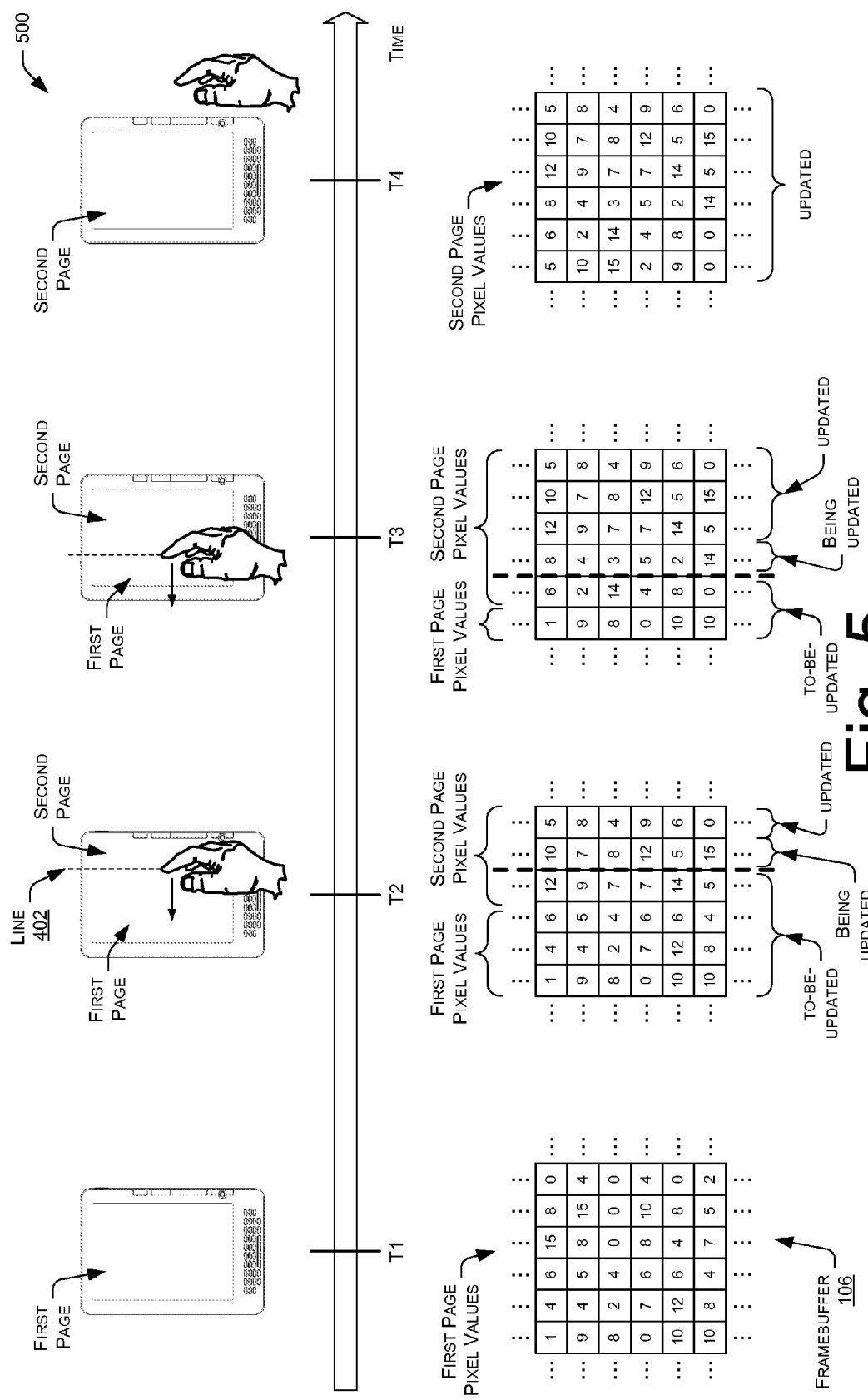
FIG. 5 illustrates another example timeline of the device implementing an incremental page transition in response to receiving the request from the user to navigate from the first page of the content item to the second page. In this illustrated example, the device incrementally fills the framebuffer with pixel values corresponding to the second page and then incrementally updates the display with reference to the pixel values corresponding to the second page.

FIG. 5 illustrates another example timeline 500 of the device 100 implementing an incremental page transition in response to receiving the request from the user to navigate from the first page of the electronic book to the second page. In this illustrated example, the device incrementally fills the framebuffer 106 with pixel values corresponding to the second page and then incrementally updates the display with reference to the pixel values corresponding to the second page. As described herein, the device may fill the framebuffer with a certain amount of pixel values and the issue instructions to update the corresponding pixels over time. That is, the device may fill the framebuffer with a certain amount of pixels and then "uncover" those pixel values at the corresponding pixels with a series of sequential instructions to the display controller.

Again, at a time T1 the device 100 renders the first page of the electronic book. At a time T2, the user again requests (via a right-to-left swiping gesture) to navigate to the second page of the electronic book. In response, and as illustrated underneath the timeline 500, the electronic device 100 has filled the framebuffer with a subset of pixel values corresponding to the second page of the electronic book. Specifically, the device 100 has filled the framebuffer 106 with a region of pixel values of the second page corresponding to the pixels to the right of the line 402 and, potentially, corresponding to a region to the left of and adjacent to the line 402. By doing so, the device 100 is ready to update the display if the user continues to swipe from the right to the left. Furthermore, if the user does in fact continue to swipe from the right to the left, the device 100 may continue to fill the framebuffer with pixel values of the second page that are associated with blocks of pixels that are adjacent to the blocks that have already been filled with values from the second page. Furthermore, and as illustrated, at the time T2 the device 100 has updated a far right block(s) of pixels, is currently updating a block of pixels to the left of the update pixels, and has yet to update blocks of pixels to the left of the line 402.

In some instances, the size of the subset of the second page is determined at least partly with reference to a speed of the swipe gesture across the touch-sensitive electronic paper display. For instance, if a user begins to swipe her finger very quickly across the screen, then the device 100 may measure this speed and load relatively large regions of pixel values corresponding to the second page into the framebuffer 106. By doing so, the device 100 is able to render the pixels corresponding to the first page while staying ahead of the user's gesture. Conversely, if the user's gesture is relatively slower, then the device 100 may pull in a relatively smaller block of pixels from the second page into the framebuffer 106.

As illustrated, at a time T4, the user has completed the left-to-right swipe gesture and, in response, the device 100 has filled the entire framebuffer 106 with contents from the second page and has rendered the entirety of the second page of content.

Figure 6:
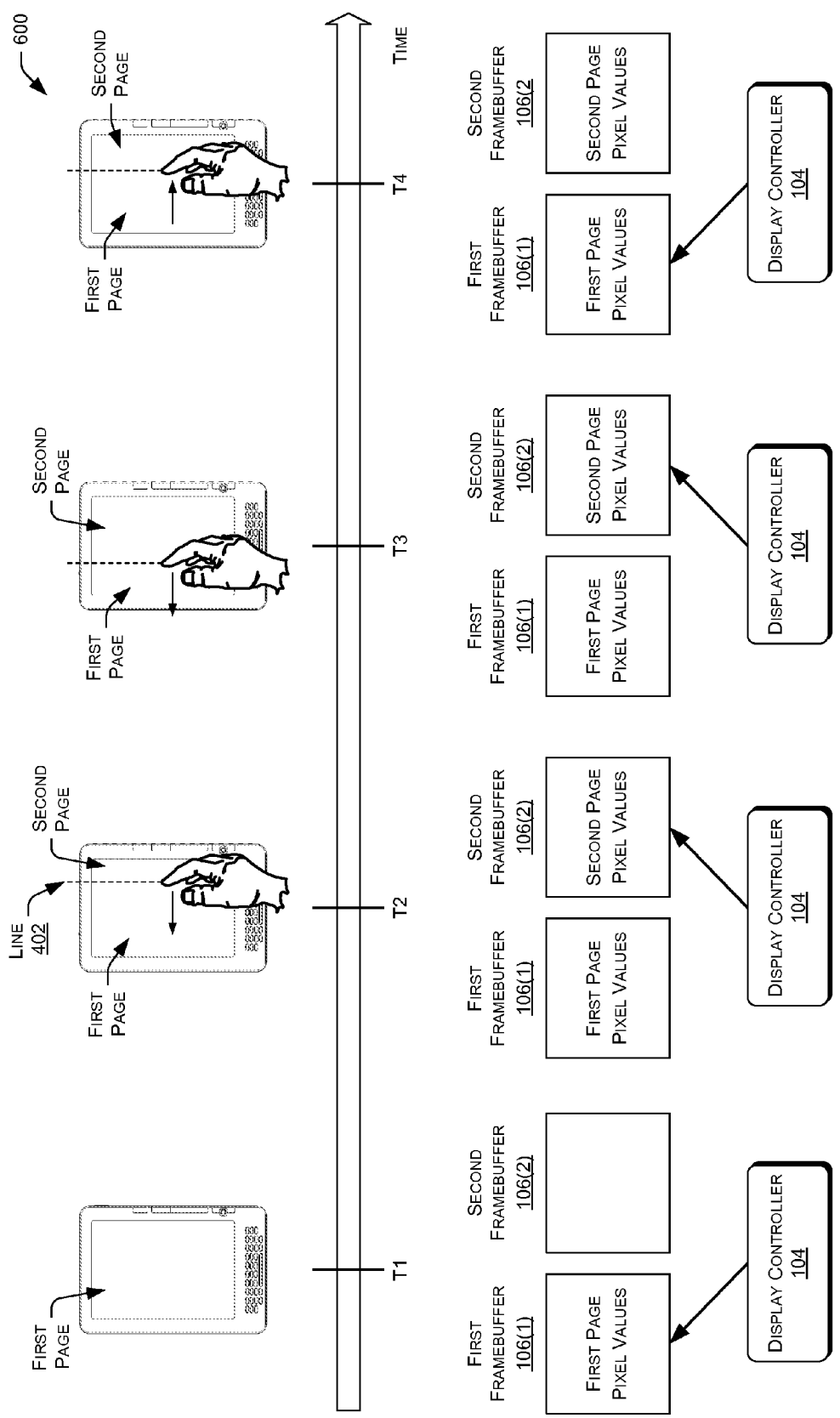
FIG. 6 illustrates another example timeline of the device implementing an incremental page transition in response to receiving the request from the user to navigate from the first page of the content item to the second page. In this illustrated example, the device implements two framebuffers, the first of which includes the contents of the first page, which the device renders at a time, T1. In response to receiving the request, the device fills the second framebuffer with pixel values corresponding to the second page and then updates the display with reference to the first or second framebuffer depending upon a direction of the touch input across the display.

FIG. 6 illustrates yet another example timeline 600 of the device implementing an incremental page transition in response to receiving the request from the user to navigate from the first page of the electronic book to the second page. In this illustrated example, the device 100 includes two framebuffers 106(1) and 106(2). As illustrated, the first framebuffer 106(1) includes the contents of the first page, which the device renders at a time, T1. The second framebuffer 106(2), meanwhile, may be empty or may include values of a previously rendered page of content.

At a time T2, the device 100 receives the request to navigate to the second page of the electronic book. In response, the device fills the second framebuffer 106(2) with pixel values corresponding to the second page and then begins updating the display to include the second page of content as the user's gesture moves across the display. For instance, as the user moves her from the right to the left, the display controller 104 updates the screen to the right of the line 402 with pixel values from the second framebuffer 106(2) corresponding to the second page. At a time T3, the user has continued to move the swiping gesture to the left, and the display controller 104 has continued to update the display with use of the pixel values from the second framebuffer 106(2).

At a time T4, however, the user has now changed the direction of the swiping gesture, which is now going from left to right across the screen. In response, the display controller 104 now points to the first framebuffer 106(1) and begins updating the portion of the display to the left of the line 402 with pixel values corresponding to the first page. With use of both framebuffers 106(1) and 106(2), the device 100 is able to perform page transitions that track the touch input across the electronic paper display 102.

Example Processes

Figure 7:
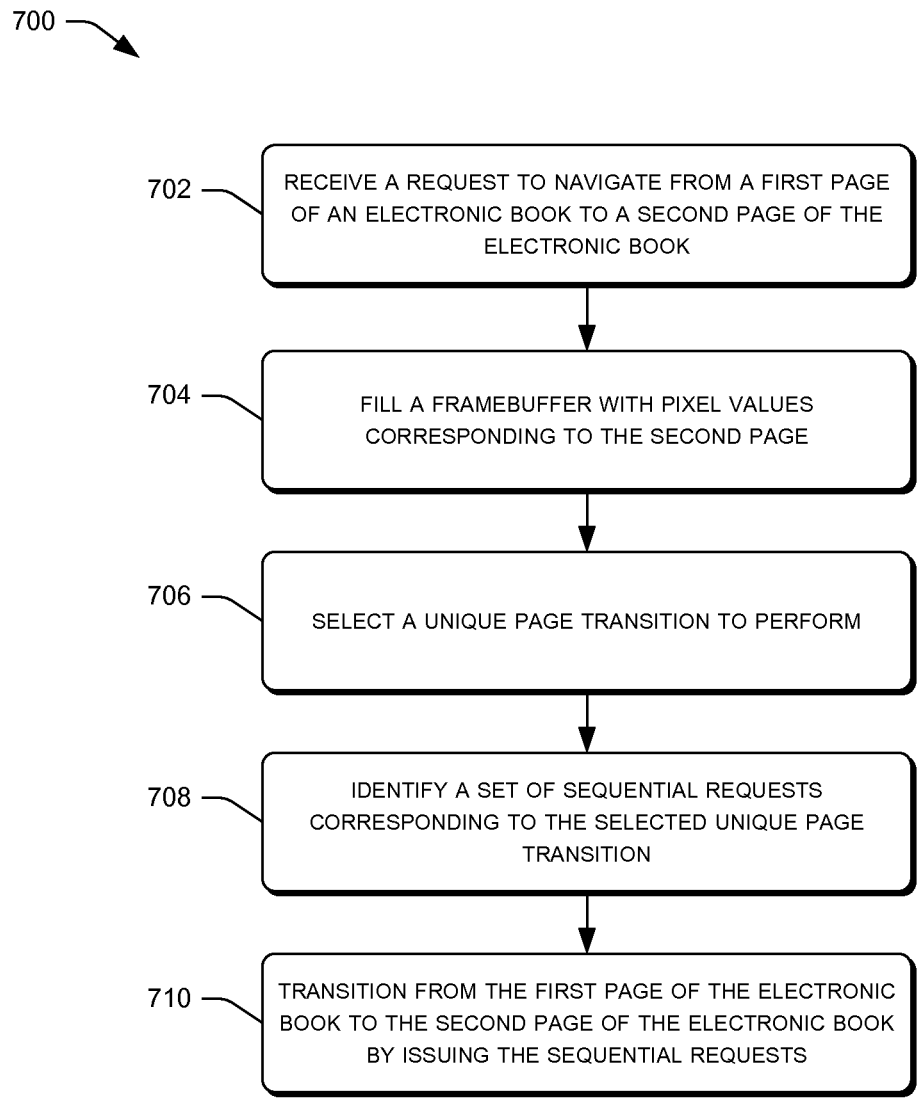
FIG. 7 illustrates an example process for performing an incremental page transition in response to a request from a user to navigate from a first page of a content item to a second page.

FIG. 7 illustrates an example process for performing an incremental page transition in response to a request from a user to navigate from a first page of a content item to a second page. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 700 includes, at 702, receiving a request to navigate from a first page of an electronic book to a second page of the electronic book. At 704, the process 700 fills a framebuffer with pixel values corresponding to the second page of the electronic book at least partly in response to receiving the request. At 706, the process 700 selects a page transition to perform at least partly in response to receiving the request. For instance, the process 700 may reference the datastore 120 discussed above with reference to FIG. 1 to select a page transition to perform, such as a rolling page transition, a burn page transition, a corner page transition, or any other transition described herein. In some instances, the selected transition may be specified by the electronic book, by a user's stored preference, and/or with reference to any other factor.

At 708, the process 700 identifies, from the datastore, the respective set of sequential instructions corresponding to the selected page transition. At 710, the process 700 then transitions from the first page of the electronic book to the second page of the electronic book by issuing the identified sequential instructions to the display controller. As described above, each of the sequential instructions may define a respective group of one or more pixels to update with content from the second page. The instructions may identify pixels individually, by regions, by specifying characteristics associated with the pixels, or in any other manner. For instance, the instructions may specify that particular pixels be updated, that pixels within a particular region be updated, that pixels having certain characteristics (determined via metadata associated with the pixels) be updated, that pixels not having these certain characteristics be updated, or the like.

Figure 8:
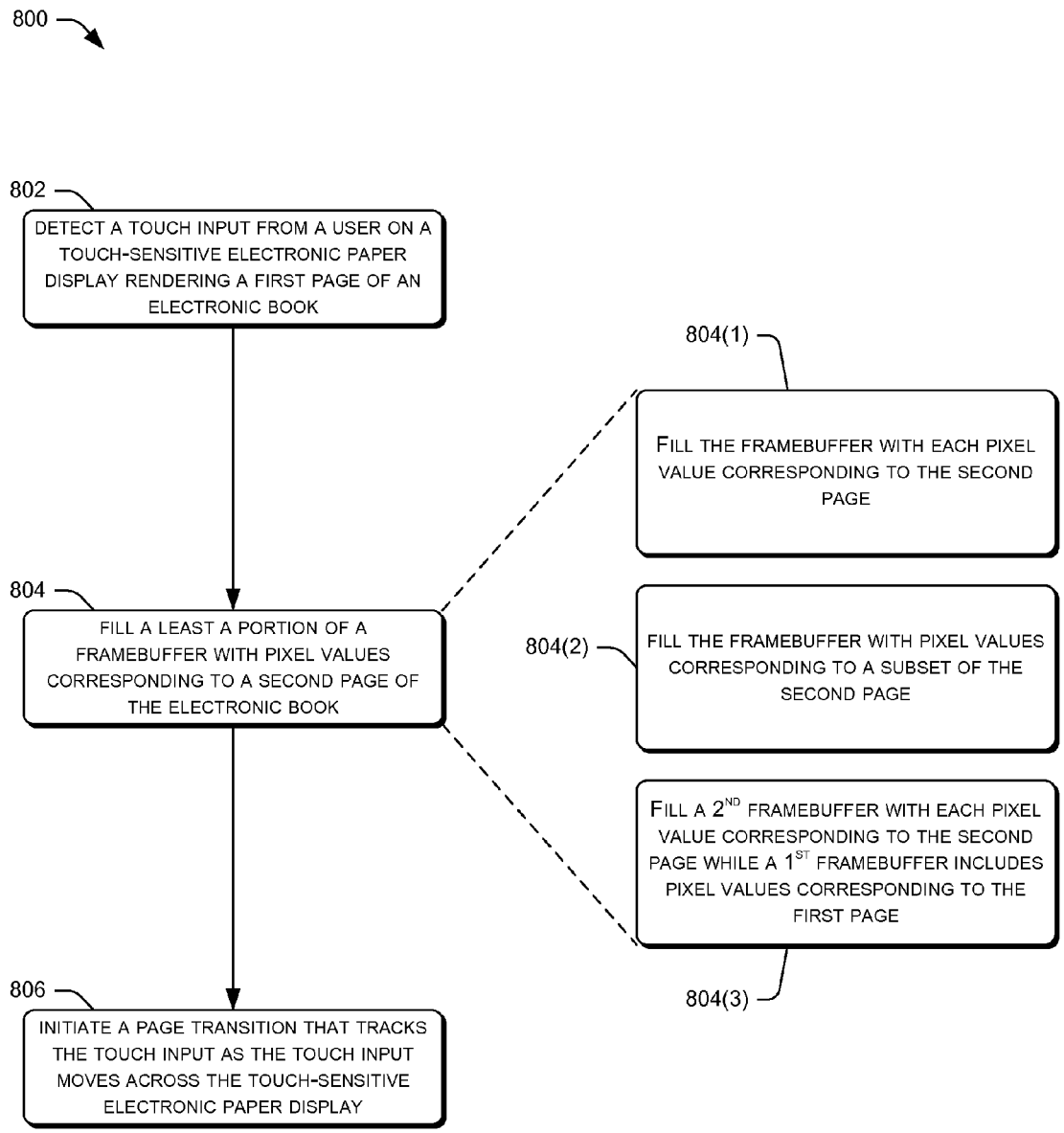
FIG. 8 illustrates an example process for performing an incremental page transition that tracks a touch input across a touch-sensitive electronic display.

FIG. 8 illustrates an example process 800 for performing an incremental page transition that tracks a touch input across a touch-sensitive electronic display. At 802, the process 800 detects a touch input from the user on the touch-sensitive electronic paper display. In this example, the touch input comprises a gesture to transition from a first page of an electronic book to a second page of the electronic book. At 804, the process 800 fills at least a portion of a framebuffer with pixel values corresponding to the second page. As described above with reference to FIGS. 4-6, this operation may be done in several manners.

For instance, the process may, at 804(1), fill the framebuffer with each pixel value corresponding to the second page in response to detecting the touch input. That is, in response to receiving the gesture instructing the device to turn to the second page, the device 100 may fill the entire framebuffer with contents of the second page. In an alternative implementation, the device 100 may, at 804(2), fill the framebuffer with pixel values corresponding to a subset of the second page. For instance, as discussed above with reference to FIG. 5, the device 100 could fill the framebuffer with pixel values of the second page corresponding to a region adjacent to and in front of the touch input. In some instances, a size of this region may be based at least in part on a speed of the touch input across the display. Finally, at 804(3), the device 100 could instead implement two or more framebuffers. In these instances, the device 100 could fill a second framebuffer with pixel values corresponding to the second page while a first framebuffer maintains the pixel values corresponding to the first page.

Finally, at 806, the process 800 initiates a page transition that tracks the touch input as the touch input moves across the touch-sensitive electronic paper display. For instance, the device 100 may issue instructions to update the electronic paper display that track the location of the user's touch input on the display.

Figure 9:
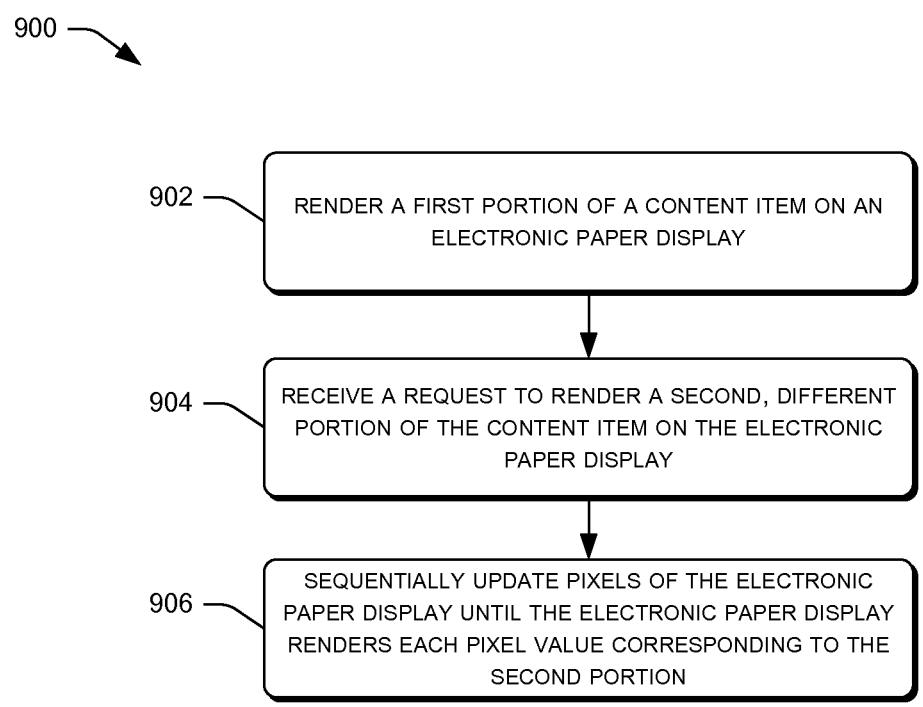
FIG. 9 illustrates another example process for performing an incremental transition in response to a request from a user to navigate from a first portion of a content item to a second portion.

FIG. 9 illustrates another example process 900 for performing an incremental transition in response to a request from a user to navigate from a first portion of a content item to a second portion. At 902, the process 900 renders a first portion of a content item on the electronic paper display. At 904, the process 900 receives a request to render a second, different portion of the content item on the electronic paper display. Again, the device 100 may receive this request via a touchscreen, a physical button or control, an audible command, or the like. Furthermore, the second portion may cover all or only a portion of the display. For instance, the second portion of the content item may comprise a page of an electronic book, or may simply comprise a pop-up menu, a virtual keyboard being rendered on the device, or any other piece of content. In some instances, the second portion may comprise content in two or more different regions on the display (e.g., the top and the bottom). In these instances, the two or more regions may be updated in an alternating manner.

Finally, at 906 and in response, the process 900 sequentially updates blocks of pixels of the electronic paper display until the electronic paper display renders each pixel value corresponding to the second portion of the content item. Collectively, the sequential updates may appear to a user to roll or otherwise move across the screen or a portion of the screen in an animated manner. This animation may comprise any of the transitions described above, or any other transition that involves sequentially updating blocks of text to render a new piece of content on the electronic paper display. Again, this new piece of content may cover the entire display or only a portion.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic book reader device comprising:
   an electronic paper display configured to render content and comprising a plurality of pixels;
   a display controller configured to update the content rendered on the electronic paper display;
   a framebuffer from which the display controller updates the content on the electronic display;
   one or more processors; and
   one or more computer-readable media storing:
      a datastore that includes a plurality of schedules of sequential instructions, wherein individual schedules of sequential instructions cause the display controller to perform a particular animation for transitioning between pages; and
      computer-executable instructions that, when executed on the one or more processors, cause the one or more processors to perform acts comprising:
         receiving a request to navigate from a first page of an electronic book to a second page of the electronic book;
         determining an animation for transitioning from the first page to the second page;
         determining, from the datastore, a schedule of sequential instructions corresponding to the animation; and
         transitioning from the first page of the electronic book to the second page of the electronic book via the animation by filling the framebuffer with pixel values corresponding to the second page and providing the schedule of sequential instructions to the display controller, each sequential instruction of the schedule of sequential instructions identifying a respective group of one or more pixels to update with corresponding pixel values from the framebuffer.

2. An electronic book reader device as recited in claim 1, wherein the display controller is configured to update the content rendered on the electronic paper display on a per-pixel level.

3. An electronic book reader device as recited in claim 1, wherein the display controller is configured to update the content rendered on the electronic paper display in blocks comprising multiple pixels.

4. An electronic book reader device as recited in claim 1, wherein the sequential instructions collectively cause the display controller to update each of the plurality of pixels of the electronic paper display with content from the second page.

5. An electronic book reader device as recited in claim 1, wherein:
   the electronic paper display is configured to render at least white, black, and gray pixels; and
   each of the sequential instructions instructs the display controller to first change a value of each respective pixel of the respective group of one or more pixels to black or white and, thereafter, to a value corresponding to content of the second page at the respective pixel.

6. An electronic book reader device as recited in claim 1, wherein each of the sequential instructions instructs the display controller to change a value of each respective pixel of the respective group of one or more pixels to a value corresponding to content of the second page at the respective pixel.

7. An electronic book reader device as recited in claim 1, wherein each of the sequential instructions identifies a respective group of pixels that does not overlap with any other pixel identified by any other of the sequential instructions.

8. An electronic book reader device as recited in claim 1, wherein the transitioning includes one or more of:
   a page transition that updates pixels of the electronic paper display from left to right, right to left, top to bottom, bottom to top, or corner to corner;
   a page transition that updates pixels of the electronic paper display radially outwards from one or more origin pixels; or
   a page transition that updates pixels of the electronic paper display beginning at a corner of the electronic paper display and arcing around to a remainder of the electronic paper display.

9. An electronic device comprising:
   an electronic paper display configured to render content;
   a touch sensor configured to accept touch inputs from a user;

one or more processors; and one or more computer-readable media storing computer-executable instructions that, when executed on the one or more processors, cause the one or more processors to perform acts comprising:

detecting a touch input from the user on the touch sensor while the electronic paper display renders a first page of an electronic book;

determining a schedule of sequential instructions for updating the electronic paper display such that a page transition tracks the touch input as the touch input moves across the touch sensor; and initiating the page transition from the first page of the electronic book to a second, different page of the electronic book by issuing the schedule of sequential instructions to update the electronic paper display such that the page transition tracks the touch input as the touch input moves across the touch sensor.

10. An electronic device as recited in claim 9, wherein the touch sensor resides underneath, atop, or integral with the electronic paper display to form a touch-sensitive electronic paper display.

11. An electronic device as recited in claim 10, wherein:
the touch input from the user comprises a swipe gesture; and
the page transition tracks the touch input by rendering content from the second page of the electronic book at pixels located behind the swipe gesture while continuing to render at least a portion of content from the first page at pixels located in front of the swipe gesture.

12. An electronic device as recited in claim 11, wherein:
the swipe gesture is substantially in a first direction that defines a line that is perpendicular to the first direction and that intersects a current location of the touch input;
the pixels located behind the swipe gesture comprise those pixels on a first side of the line that is opposite the first direction; and
the pixels located in front of the swipe gesture comprises those pixels on a second, opposite side of the line.

13. An electronic device as recited in claim 11, further comprising:
a display controller to update the content on the touch-sensitive electronic paper display; and
a framebuffer from which the display controller updates the content;
and wherein the acts further comprise filling the framebuffer with each pixel value corresponding to the second page of the electronic book at least partly in response to detecting the touch input.

14. An electronic device as recited in claim 11, further comprising:
a display controller to update the content on the touch-sensitive electronic paper display; and
a framebuffer from which the display controller updates the content;
and wherein the acts further comprise filling the framebuffer with pixel values corresponding to a subset of the second page of the electronic book at least partly in response to detecting the touch input.

15. An electronic device as recited in claim 14, wherein the pixels values corresponding to the subset of the second page includes pixel values corresponding to a region of the touch-sensitive electronic paper display that is adjacent to and in front of the swipe gesture.

16. An electronic device as recited in claim 14, wherein a size of the subset of the second page is determined at least partly with reference to a speed of the swipe gesture across the touch-sensitive electronic paper display.

17. An electronic device as recited in claim 16, wherein the size is relatively greater when the speed is relatively faster and the size is relatively smaller when the speed is relatively slower.

18. An electronic device as recited in claim 11, further comprising:
a display controller to update the content on the touch-sensitive electronic paper display; and
first and second framebuffers from which the display controller updates the content, the first framebuffer including pixel values corresponding to the first page of the electronic book when the touch input is detected;
and wherein the acts further comprise filling the second framebuffer with pixel values corresponding to the second page of the electronic book at least partly in response to detecting the touch input.

19. An electronic device as recited in claim 18, wherein the display controller updates the touch-sensitive electronic paper display by switching between performing updates from the first framebuffer and the second framebuffer, the switching being based at least in part on the touch input on the touch-sensitive electronic paper display.

20. An electronic device as recited in claim 11, wherein the swipe gesture comprises a right-to-left swipe gesture, a left-to-right swipe gesture, a top-to-bottom swipe gesture, a bottom-to-top swipe gesture, or a diagonal swipe gesture originating near a corner of the touch-sensitive electronic paper display.

21. An electronic device as recited in claim 9, further comprising a display controller configured to update the content rendered on the electronic paper display on a per-pixel level.

22. An electronic device as recited in claim 9, further comprising a display controller configured to update the content rendered on the electronic paper display in blocks comprising multiple pixels.

23. A method comprising:
under control of an electronic device that includes an electronic paper display and is configured with executable instructions,
rendering a first portion of a content item on the electronic paper display;
receiving a request to render a second, different portion of the content item on the electronic paper display, the second portion of the content item corresponding to a set of pixels of the electronic paper display;
determining an animation for transitioning from the first portion of the content item to the second portion of the content item;
determining a schedule of sequential instructions corresponding to the animation; and
transitioning from the first portion of the content item to the second portion of the content item via the animation by filling a framebuffer with pixel values corresponding to the set of pixels and updating the set of pixels of the electronic paper display until the electronic paper display renders each pixel value from the framebuffer corresponding to the second portion of the content item based at least in part on the schedule of sequential instructions.

24. A method as recited in claim 23, wherein the updating includes performing at least one update that updates a single pixel of the electronic paper display.

25. A method as recited in claim 23, wherein the updating the blocks of pixels comprises performing a flashing update that rolls across the electronic paper display.

26. A method as recited in claim 23, wherein the updating the blocks of pixels comprises beginning the updating at a first edge of the electronic paper display and ending the updating at a second, opposite edge of the electronic paper display.

27. A method as recited in claim 23, wherein the updating comprises performing an update to blocks of pixels having a relatively smaller size near the first edge, a relatively larger size near a center of the electronic paper display, and a relatively smaller size near the second edge.

28. A method as recited in claim 23, wherein the updating the blocks of pixels comprises beginning the updating at a first corner of the electronic paper display and ending the updating at a second, opposite corner of the electronic paper display.

29. A method as recited in claim 23, wherein the updating the blocks of pixels comprises updating pixels of the electronic paper display radially outwards from one or more origin pixels.

30. A method as recited in claim 23, wherein the updating the blocks of pixels comprises updating pixels of the electronic paper display beginning at a corner of the electronic paper display and arcing around to a remainder of the electronic paper display.

* * * * *